United States Patent
Mitchell

(10) Patent No.: US 8,578,428 B2
(45) Date of Patent: Nov. 5, 2013

(54) AIR-TO-GROUND COMMUNICATIONS SYSTEM AND METHOD

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/215,607

(22) Filed: Aug. 23, 2011

(65) Prior Publication Data
US 2013/0055320 A1  Feb. 28, 2013

(51) Int. Cl.
*H04N 7/18* (2006.01)
(52) U.S. Cl.
USPC .............. 725/76; 725/77; 709/231; 709/234
(58) Field of Classification Search
USPC ......................................................... 725/76
See application file for complete search history.

(56) References Cited

U.S. PATENT DOCUMENTS

| | | | |
|---|---|---|---|
| 2003/0200547 A1* | 10/2003 | Frisco et al. | 725/77 |
| 2005/0128362 A1* | 6/2005 | Teichner et al. | 348/725 |
| 2006/0077994 A1* | 4/2006 | Spindola et al. | 370/412 |
| 2007/0028274 A1* | 2/2007 | Walker et al. | 725/90 |
| 2008/0102813 A1 | 5/2008 | Chari et al. | |
| 2008/0141314 A1* | 6/2008 | Lemond et al. | 725/76 |
| 2011/0093605 A1* | 4/2011 | Choudhury et al. | 709/231 |
| 2012/0009942 A1* | 1/2012 | Zoubir | 455/456.1 |
| 2012/0298737 A1* | 11/2012 | Thakar et al. | 235/375 |

FOREIGN PATENT DOCUMENTS

WO  WO 2009151735 A1  12/2009

OTHER PUBLICATIONS

Hague et al., Field Experimentation of Cots-Based UAV Networking, Military Communications Conference, 2006. MILCOM 2006. IEEE. [retrieved on Jul. 20, 2012]. Retrieved from the Internet: <URL: http://www.eecs.harvard.edu/~htk/publication/2006-milcom-hague-kung-suter.pdf>.

* cited by examiner

*Primary Examiner* — Robert Hance
(74) *Attorney, Agent, or Firm* — Donna P. Suchy; Daniel M. Barbieri

(57) ABSTRACT

A video signal processing system and method is disclosed. The video signal processing system includes at least two receiving modules configured for independently receiving signals for the same video program. Each receiving module is further configured for processing the signals received and providing a corresponding video stream. The video signal processing system further includes a synchronization module and a data processing module. The synchronization module is configured for determining a latency difference between the at least two video streams, and the data processing module is configured for comparing and combining the at least two video streams to provide a merged video stream, which may have a reduced number of damaged or missing frames.

14 Claims, 3 Drawing Sheets

AIR-TO-GROUND COMMUNICATIONS SYSTEM AND METHOD

CROSS-REFERENCE TO RELATED APPLICATIONS

This application is related to co-pending U.S. patent application Ser. No. 12/827,632 filed on Jun. 30, 2010 and entitled "Aviation Cellular Communications System and Method," which is incorporated herein by reference.

This application is also related to co-pending U.S. patent application Ser. No. 12/891,107 filed on Sep. 27, 2010 and entitled "Doppler Compensated Communications Link," which is incorporated herein by reference.

This application is further related to co-pending U.S. patent application Ser. No. 12/891,139 filed on Sep. 27, 2010 and entitled "Airborne Cell Tower Selection System and Method," which is incorporated herein by reference.

This application is further related to co-pending U.S. patent application Ser. No. 13/090,792 filed on Apr. 20, 2011 and entitled "Air-To-Ground Antenna," which is incorporated herein by reference.

This application further relates to co-pending and concurrently filed U.S. patent application Ser. No. 13/215,352, and entitled "Cellular Based Aviation Video System" listing James P. Mitchell as inventor, the entirety of which is incorporated herein by reference.

TECHNICAL FIELD

The present disclosure relates generally to communication systems and more particularly to an aircraft video receiver system.

BACKGROUND

Growing demand for delivery of video content poses one of the biggest challenges in mobile communications. Providing live video content may be even more challenging in certain situations. One example of such a situation is air travel, and it is becoming increasingly popular and necessary to provide in-flight entertainment to passengers and video teleconferencing for business travelers.

Certain aircraft satellite television systems have been developed to provide in-flight entertainment to passengers. Such systems may utilize antennas for receiving signals from satellites that provide television programming to passengers. While television programming may be provided utilizing such systems, they are very expensive to develop/operate. Furthermore, the satellites utilized for providing the television programming generally are the highest in EIRP (Effective Radiated Power) in order to close the link with inherently small antenna on the aircraft. Leasing high EIRP satellites is expensive.

Ground-based communication systems may provide a low-cost option for delivery of video contents. However, the elevated position and the relatively fast movement of the aircraft with respect to the ground-based communication systems may pose certain challenges (e.g., dropped frames in video contents). Therein lies the need to provide an air-to-ground communications system and method suitable for delivery of video contents.

SUMMARY

The present disclosure is directed to an in-flight video system. The in-flight video system includes two receiving modules positioned on the aircraft. The first receiving module may be configured for: receiving signals for a video program delivered utilizing a ground-based communication system, processing the signals received by the first receiving module and providing a first video stream; the second receiving module may also be configured for: receiving signals for the same video program delivered utilizing the ground-based communication system, processing the signals received by the second receiving module and providing a second video stream. The two receiving modules operate independently with respect to each other. The in-flight video system also includes a synchronization module communicatively connected with the first receiving module and the second receiving module, the synchronization module configured for: determining a latency difference between the first video stream and the second video stream, and synchronizing the first video stream and the second video stream based on the identified latency difference. The in-flight video system further includes a data processing module configured for: identifying damaged or missing frames in the first video stream and the second video stream, and providing a merged video stream for distribution to an end device onboard the aircraft, the merged video stream including frames from the first video stream and the second video stream.

A further embodiment of the present disclosure is directed to a method for processing video signals. The method may include utilizing a first receiving module to receive signals for a video program; utilizing a second receiving module to receive signals for the same video program, the second receiving module operates independently with respect to the first receiving module; processing the signals received by the first receiving module and the second receiving module to produce a first video stream and a second video stream, respectively; determining a latency difference between the first video stream and the second video stream for synchronization of the first video stream and the second video stream; and providing a merged video stream based on the first video stream and the second video stream, the merged video stream including frames from the first video stream and the second video stream.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

Various ground-based communication systems may provide a low-cost option for delivery of video contents. For instance, cellular network communication standards such as Long Term Evolution (LTE), 3GPP, UMTS, WiMax and other 4G and 5G type technologies may utilize broadcasting, unicasting, multicasting, TCP transmission or the like to deliver live video over cellular networks. Therefore, it may be appreciated to provide the ability for an aircraft to communicate with ground-based cellular networks and to provide in-flight delivery of video contents. However, it is not uncommon for ground-based mobile users to experience occasional video frame freezes due to damaged or dropped frames/packets. Such problems may become more noticeable and undesirable when presented on a large display onboard an aircraft, especially when high quality of services (QOS) are expected (e.g., for video conferencing on a business jet or the like).

Furthermore, the elevated position and the relatively fast movement of the aircraft with respect to the ground-based communication systems may pose additional challenges. For instance, the ground-based communication systems may include multiple ground stations (e.g., cellular towers) to provide coverage over a given area. Each tower may have a characteristic latency that may be different from others. That is, the data signals being delivered by the towers may not be in perfect synchronization with one another. Therefore, when the aircraft moves from one ground station (e.g., cellular tower) to another, damaged or dropped frames/packets may occur. It would therefore be appreciated to provide a video system and method for improving QOS of video contents and enabling handoff to provide continued video services as the aircraft traverses over the network nodes.

The present disclosure is directed to a video system and method for improving quality of service of video contents. For instance, the video system may utilize two or more receiving modules to independently receive signals for the same video program (e.g., the same TV channel, video program, teleconference call or the like). Each receiving module may therefore independently provide a video stream, and these video streams may be compared, synchronized and combined to form a merged video stream with reduced number of damaged or missing frames.

Figure 1:
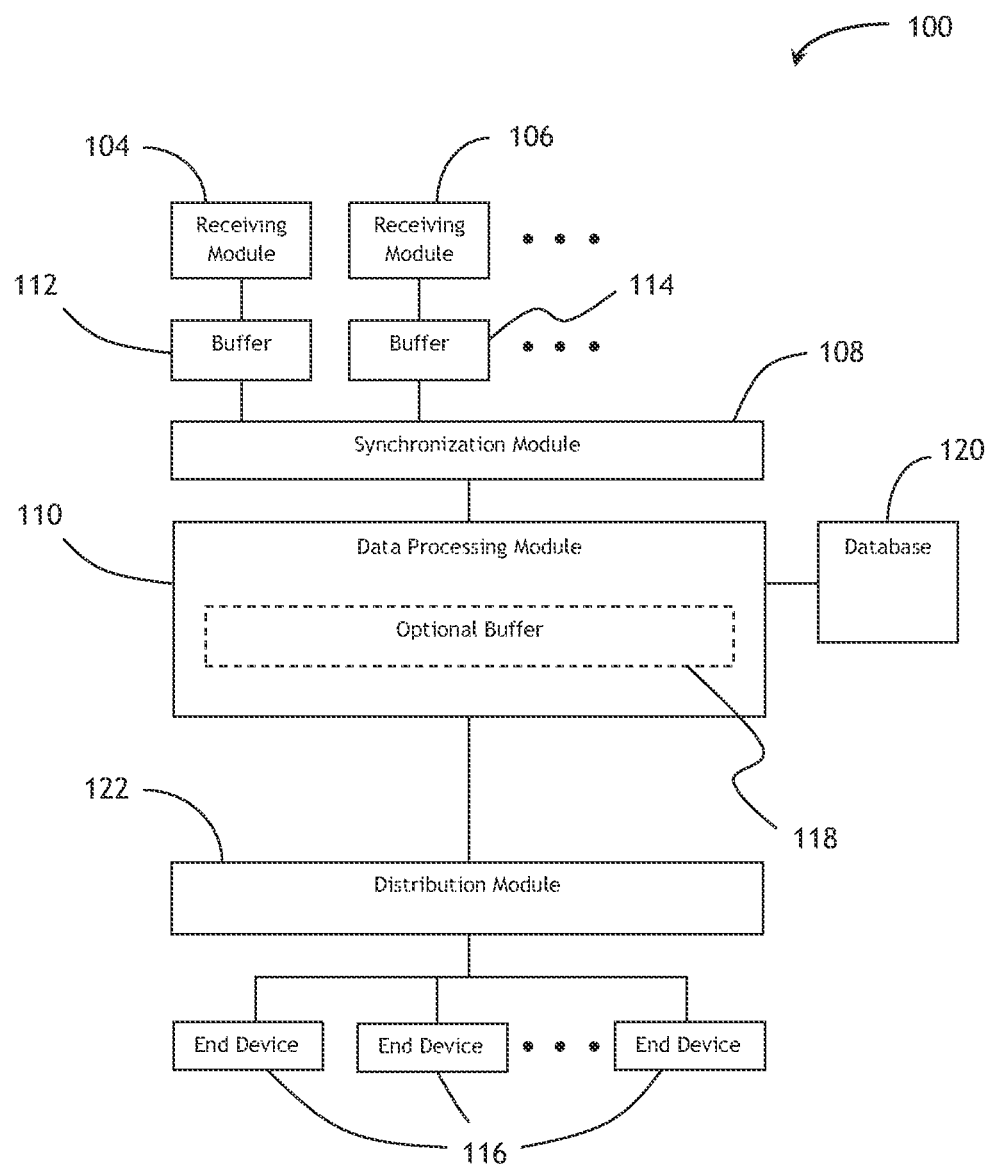
FIG. 1 is a block diagram illustrating a video signal processing system in accordance with the present disclosure.
Figure 2:
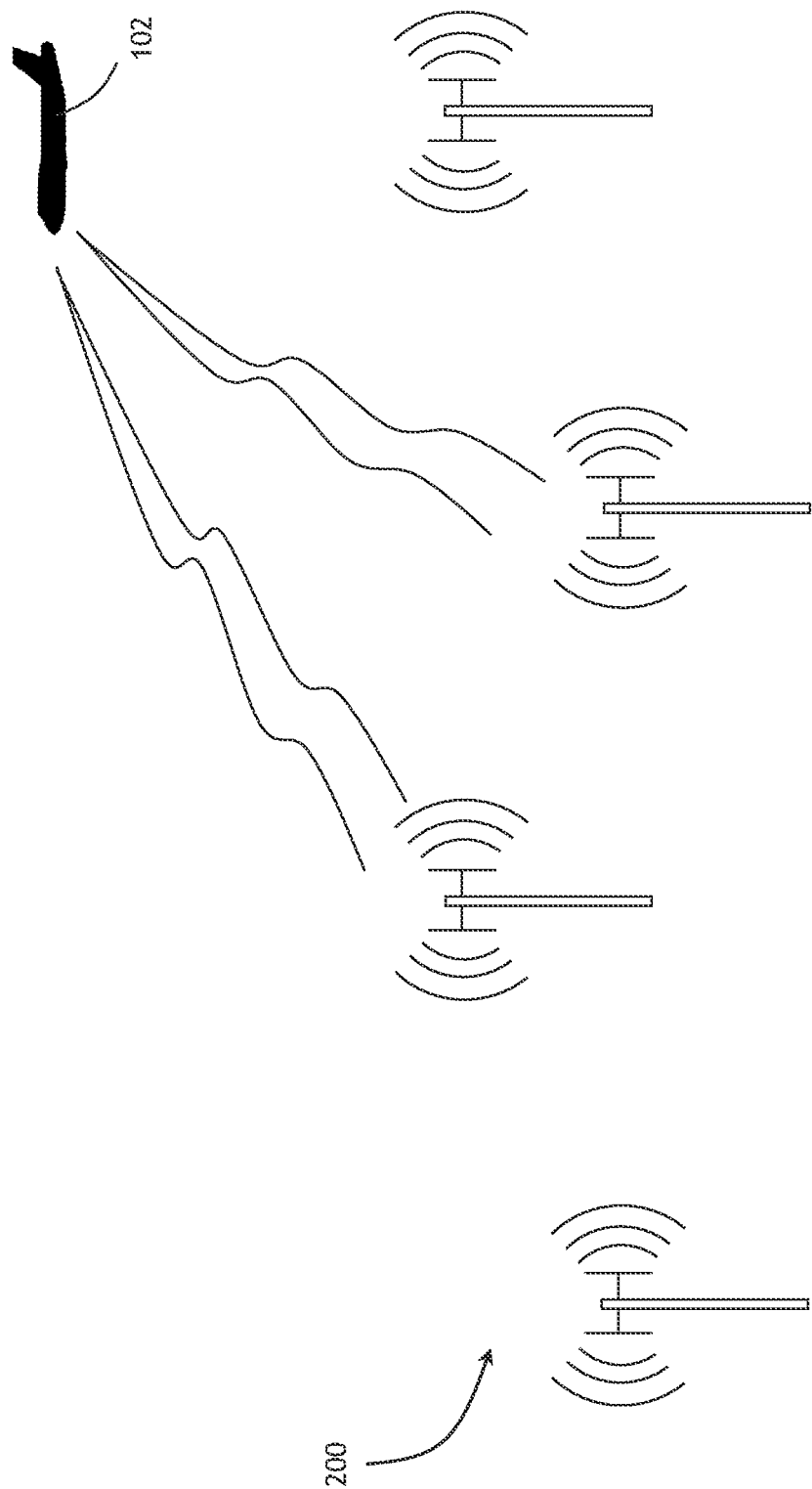
FIG. 2 illustrates utilizing the video signal processing system onboard an aircraft.

Referring generally to FIGS. 1 and 2. FIG. 1 shows a block diagram depicting a video system 100 capable of providing video services to one or more end devices 116, and FIG. 2 is an illustration depicting an aircraft 102 utilizing the video system 100 for receiving video signals delivered by a ground-based communication network 200. In one embodiment, the communication network 200 may be communicatively connected to one or more service/content providers and is capable of delivering video signals provided by these service/content providers. Exemplary ground-based communication networks 200 may include any type of cellular network that is capable of delivering video signals. Such networks may include, for example, Long Term Evolution (LTE), 3GPP, UMTS, WiMax, other 4G and 5G type networks or the like. The video signals may be delivered according to various routing schemes, including, but not limited to broadcast, unicast, multicast or the like.

In one embodiment, the video system 100 may include two or more receiving modules associated with each video program. For instance, a first receiving module 104 and a second receiving module 106 may each independently receive signals for the same video program. The first receiving module 104 and the second receiving module 106 may each include a directional antenna to engage data transmissions with a ground station (may also be referred to as a tower). In the example as illustrated in FIG. 2, the first receiving module 104 may receive signals from tower 202 and the second receiving module 106 may receive signals from another tower 204 different and separated from tower 202. Having two or more receiving modules receiving the same data/video program from separate towers may improve the overall quality of the signals received, especially when certain towers may experience relatively poor coverage (due to various reasons such as bad weather, location, unstable power supply, poor radio frequency link or the like). However, in situations where only one tower is visible, both receiving modules 104 and 106 may independently receive signals from the same tower and providing redundancy which may still be beneficial.

Each receiving module may process the received signals and produce a corresponding data/video stream. For example, each receiving module may include a receiver for receiving data signals. The signals received may then go through a receiver modem, an error correction unit and a video decoder in order to produce the corresponding video stream. It is understood that various decoding, decompressing and/or other video processing steps may be applied to obtaining the video stream based on the received signals without departing from the spirit and scope of the present disclosure.

In one embodiment, the video streams produced by the receiving modules 104 and 106 may be stored in buffers 112 and 114, respectively. These buffered video streams may then be compared and combined to form a merged video stream with reduced number of damaged or missing frames. It is contemplated that each video stream may inherently have different latency characteristics due to different ground network conditions and/or potentially different receiving module performance properties. Therefore, the buffered video streams may need to be synchronized first. In one embodiment, a synchronization module 108 may be utilized to scan the buffered video streams and identify the latency difference(s) between the first video stream and the second video stream. For instance, if the same frame arrives slightly earlier (e.g., a few milliseconds) in the first video stream compared to the second video stream, the same amount of time may be used to slightly delay/offset the first video stream so that the two video streams may be synchronized.

The buffers 112 and 114 may be implemented utilizing any memory device(s) capable of providing random access to each buffered stream. For instance, a dual port random access memory may be utilized to buffer the video streams. A data processing module 110 may then process the two synchronized video streams to form a merged video stream that may have reduced number of damaged or missing frames compared to either the first or the second video stream. The merged video stream may be provided by comparing and correlating the first and the second video streams and using valid data (i.e., not damaged or missing) where it is available. In one embodiment, the comparison between the two video streams may be performed at the frame level. For example, comparing each I, P or B frame in the first video stream with the corresponding I, P or B frame in the second video stream may help identifying the missing frames (if any). Furthermore, if a frame is damaged or missing (e.g., cannot be processed by the video decoder) in the first video stream but not appear to be damaged or missing in the second video stream, the frame from the second video stream may be utilized for the merged video stream. It is contemplated that the comparison may also be performed at the group of pictures (GOP) level or any other data packet level without departing from the spirit and scope of the present disclosure.

In one embodiment, the data processing module 110 may selectively read from one of the buffered streams and produce the merged stream as the output. The selection (i.e., whether to read from the first video stream or the second video stream) may be determined based on whichever buffered stream has the best available data. When it is determined that another stream different from the stream currently being read may provide better data in comparison, a switchover may be performed and the data processing module 110 may begin to read from the other stream starting at the corresponding location.

Because the buffered video streams have already been synchronized utilizing the synchronization module 108, seamless switchovers may be provided between these video streams. For instance, the synchronization module 108 may have already aligned the first and the second video streams stored in the buffers 112 and 114. In this manner, the data processing module 110 may simply toggle between the buffered video streams to perform the readout. Alternatively, the first and the second video streams are not required to be aligned. Rather, the synchronization module 108 may provide latency differences between the first and the second video streams to the data processing module 110, allowing the data processing module 110 to adjust/offset for the different latencies associated with each stream during the readout process. In either approach, the synchronization module 108 may help the data processing module 110 to produce/reconstruct the merged video stream from the buffered streams and overcome any timing differences between the buffered streams.

The merged video stream may then be distributed to one or more end devices 116 onboard the aircraft via a distribution module 122. The distribution module 122 may be communicatively connected to the end devices 116 via wired or wireless communication means. Various network routing protocols may be utilized by the distribution module 122 to distribute the merged video stream to the end devices 116. Such end devices 116 may include, for example, video teleconferencing displays, TV screens, personal entertainment systems, video projectors, in-flight entertainment devices, cellular phones or various other devices capable of display videos.

It is contemplated that the distribution of the merged video stream may be delayed for a predetermined duration (time delay) to further reduce any potential artifacts in the video. For instance, each switchover operation may have the potential to introduce a slight latency that may be noticeable to viewers if the merged video stream is distributed in real-time. An optional buffer 118 may be utilized to buffer the merged video stream and delay the distribution of the merged video stream for about a minute (as an example) in anticipation of any latency that may occur due to the switchover operations.

It is contemplated that the specific size of the optional buffer 118 and the duration of the time delay may be predetermined for various applications. For example, a relatively longer time delay (e.g., a few minutes) may be acceptable for distribution of TV programs, whereas a relatively shorter time delay (e.g., a few seconds) may be appreciated for video conferencing or the like. In addition, the size of the optional buffer and duration of the time delay may be determined based on the expected number of switchover operations (e.g., estimated based on the location of the aircraft and the available towers). For example, a longer time delay may be appreciated if a greater number of switchover operations is expected. Furthermore, the size of the optional buffer may be determined systematically and/or dynamically based on the type of the application being serviced (e.g., whether it is time critical), the number of switchover operations that may occur, as well as various other factors.

It is understood that the purpose of the video system 100 in accordance with the present disclosure is not to fill in a significant lost content due to a simultaneous link loss of both receiving modules 104 and 106. Instead, the present disclosure enables a contiguous video stream to be presented to the end devices for video playback. It is possible that certain frames may appear to be damaged or missing in both the first and the second video streams, in which case these frames may not be fully recoverable in the merged video stream. To address this issue, the processor 114 may be further configured to provide error resilient features similar to those utilized in certain video decoders (e.g., the H.264) to smooth the damaged or missing frames in the merged video stream before distributing to the end devices 116. However, such features may be deemed optional, and may be selectively engaged based on specific applications.

It is contemplated that utilizing more than two receiving modules for each particular video program may further reduce the possibilities of having damaged or missing frames in the merged video stream. The specific number of receiving modules utilized for each particular video program may be determined by taking into consideration the expected quality of services, cost, space availabilities onboard the aircraft, as well as various other factors. Different numbers of receiving modules may be utilized without departing from the spirit and scope of the present disclosure.

It is also contemplated that the video system 100 may be configured to selectively tune the receiving modules (e.g., receiving modules 104 and 106 in the examples above) to various towers based on the availabilities of the towers and the location of the aircraft. For example, the locations of the towers and their broadcasting characteristics and directions may be known (e.g., provided by the cellular network operators) and stored in a database 120 communicatively connected to the data processing module 110. In addition, the current location and the direction of travel of the aircraft may also be determined utilizing a positioning system (e.g., a global positioning unit (GPS), an inertial navigation system (INS), or the like). Based on the current location and the direction of travel of the aircraft, the data processing module 110 may determine the available/visible ground stations and selectively tune the receiving modules 104 and 106 in order to maximize connectivity and minimize interferences. Such location based aircraft to cellular network communication systems are disclosed in co-pending U.S. patent application Ser. No. 12/891,139 filed on Sep. 27, 2010 and entitled "Airborne Cell Tower Selection System and Method," which is incorporated herein by reference.

The ability to tune the receiving modules based on the availabilities of the towers and the location of the aircraft also allows for smooth handling of tower handoffs. For instance, as the aircraft moves from one tower to the next, the first receiving module 104 may continues its communication with the existing tower while the second receiving module 106 establishes communications with the next tower on the path of the direction of travel. In this manner, the two receiving modules 104 and 106 may independently receive signals for the same video program from both towers, and the synchronization module may overcome any timing differences that may exist between them, therefore providing continuous services as the aircraft traverses across the communication network.

It is contemplated that the video system 100 in accordance with the present disclosure may be utilized to process video signals delivered according to various routing schemes. Such routing schemes may include, but not limited to, broadcast, unicast, multicast or the like. The system in accordance with the present disclosure may be appreciated in routing schemes where there is no return channel available (e.g., broadcast schemes) because request for retransmission of the damaged or dropped frames is not provided in such schemes. Furthermore, the system in accordance with the present disclosure may also be appreciated in routing schemes that support return channels (e.g., using TCP, UDP or multicast), as the need for retransmission may be reduced or eliminated by utilizing two or more receiving modules for the same video program as previously described.

Figure 3:
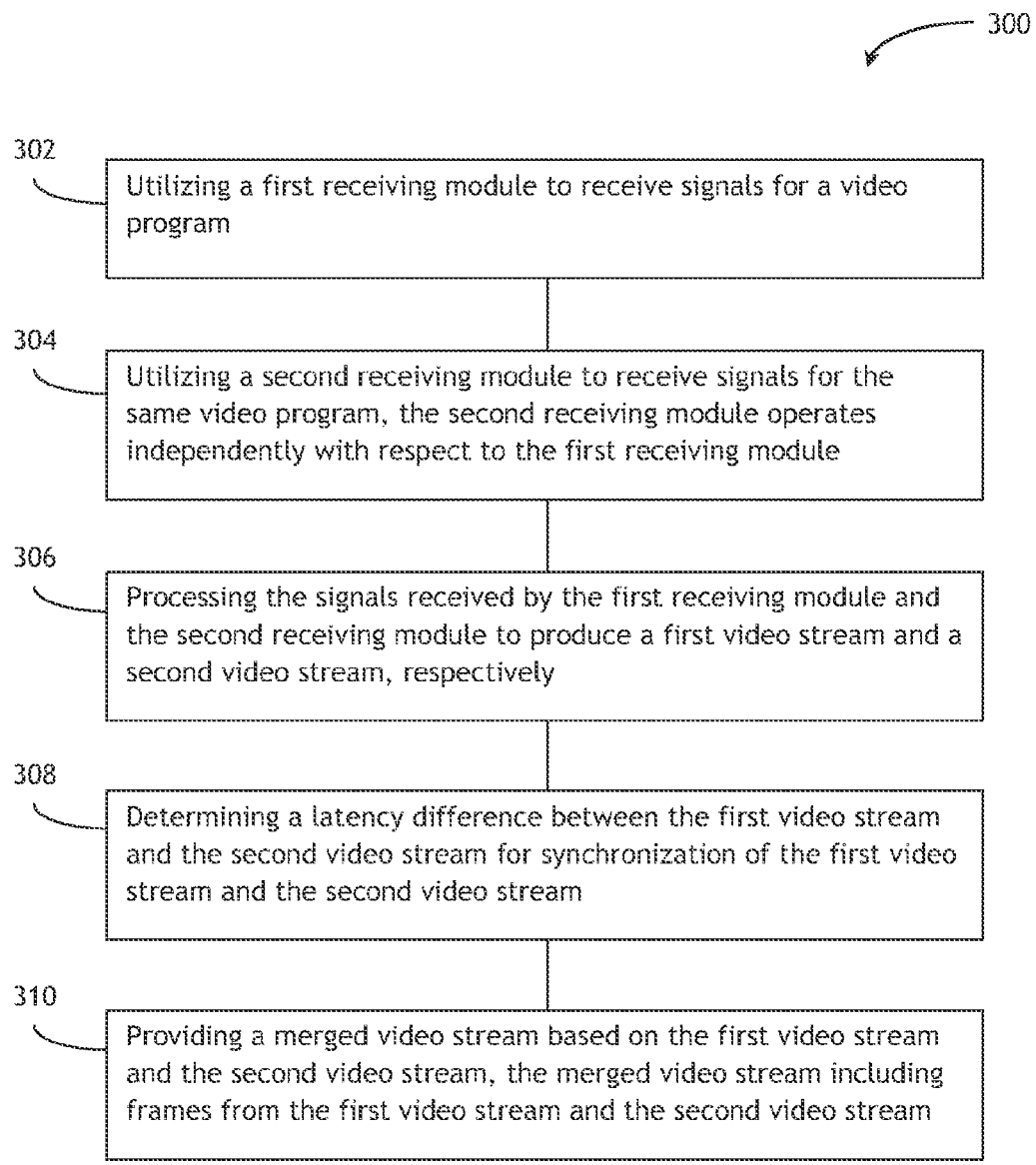
FIG. 3 is a flow chart illustrating a video signal processing method in accordance with the present disclosure.

Referring now to FIG. 3, a video signal processing method 300 is shown. The method 300 may be implemented as a part of an in-flight video system onboard an aircraft. In one embodiment, step 302 utilizes a first receiving module to receive signals for a video program while step 304 utilizes a second receiving module to receive signals for the same video program. As described above, the second receiving module may operate independently with respect to the first receiving module. Furthermore, the first receiving module and the second receiving module may receive signals from different sources (e.g., towers). Step 306 may then process the signals received by the first receiving module and the second receiving module to produce a first video stream and a second video stream, respectively. The latency differences between the first video stream and the second video stream may be determined in step 308, and step 310 may subsequently compare and combine the first video stream and the second video stream to provide a merged video stream, which may have a reduced number of damaged or missing frames as described above.

It is contemplated that the video signal processing method 300 is not limited to providing video services to aircrafts. The system and method in accordance with the present disclosure may be utilized for providing video services to various other types of vehicles and mobile devices (e.g., cellular devices or the like) without departing from the spirit and scope of the present disclosure.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. An in-flight video system, comprising:
a first receiving module positioned on an aircraft, the first receiving module configured for: receiving signals for a video program delivered utilizing a ground-based cellular network, processing the signals received by the first receiving module and providing a first video stream;
a second receiving module positioned on the aircraft, the second receiving module operates independently with respect to the first receiving module, the second receiving module configured for: receiving signals for the same video program delivered utilizing the ground-based cellular network, processing the signals received by the second receiving module and providing a second video stream;
a synchronization module communicatively connected with the first receiving module and the second receiving module, the synchronization module configured for: determining a latency difference between the first video stream and the second video stream, and synchronizing the first video stream and the second video stream based on the identified latency difference;
a data processing module communicatively connected with the synchronization module, the data processing module configured for: identifying damaged or missing frames in the first video stream and the second video stream, and providing a merged video stream for distribution to an end device onboard the aircraft, the merged video stream including frames from the first video stream and the second video stream; and
a buffer configured for buffering the merged video stream, wherein the buffer has a specific data storage size configured for delaying the distribution of the merged video stream for a specific time duration, wherein the data storage size and the time duration of the delay are determined based on a location of the aircraft with respect to the ground-based cellular network.

2. The in-flight video system of claim 1, wherein the first receiving module receives signals from a first cellular tower of the ground-based cellular network and the second receiving module receives signals from a second cellular tower of the ground-based cellular network.

3. The in-flight video system of claim 1, further comprising:
a random access memory device configured for buffering the first video stream and the second video stream.

4. The in-flight video system of claim 3, wherein the merged video stream is provided by selectively reading from the random access memory device.

5. The in-flight video system of claim 1, wherein the end device onboard the aircraft comprises at least one of: a video teleconferencing display, a TV screen, a personal entertainment system, a video projector, an in-flight entertainment device, a cellular phone, or a video display device.

6. A method for processing video signals for an in-flight video system for an aircraft, the method comprising:
utilizing a first receiving module to receive signals for a video program delivered utilizing a ground-based cellular network;
utilizing a second receiving module to receive signals for the same video program delivered utilizing a ground-based cellular network, the second receiving module operates independently with respect to the first receiving module;
processing the signals received by the first receiving module and the second receiving module to produce a first video stream and a second video stream, respectively;
determining a latency difference between the first video stream and the second video stream for synchronization of the first video stream and the second video stream;
providing a merged video stream based on the first video stream and the second video stream, the merged video stream including frames from the first video stream and the second video stream; and
buffering the merged video stream utilizing a buffer and delaying a distribution of the merged video stream to at least one end device for a duration of time, wherein the size of the buffer and the duration of the delay time are determined based on a location of the aircraft with respect to the ground-based cellular network.

7. The method of claim 6, wherein the first receiving module and the second receiving module receive signals for the same video program from different cellular towers of the ground-based cellular network.

8. The method of claim 6, further comprising:
utilizing a random access memory device to buffer the first video stream and the second video stream.

9. The method of claim 8, wherein the merged video stream is provided by selectively reading from the random access memory device.

10. A video signal processing system, comprising:
a first receiving module configured for: receiving signals for a video program delivered utilizing a ground-based cellular network, processing the signals received by the first receiving module and providing a first video stream;
a second receiving module operating independently with respect to the first receiving module, the second receiving module configured for: receiving signals for the same video program delivered utilizing the ground-based cellular network, processing the signals received by the second receiving module and providing a second video stream;
a synchronization module communicatively connected with the first receiving module and the second receiving module, the synchronization module configured for: determining a latency difference between the first video stream and the second video stream for synchronization of the first video stream and the second video stream;
a data processing module communicatively connected with the synchronization module, the data processing module configured for providing a merged video stream based on the first video stream and the second video stream, the merged video stream including frames from the first video stream and the second video stream; and
a buffer configured for buffering the merged video stream, wherein said video processing system is incorporated into an in-flight video system for an aircraft, and wherein the buffer has a specific data storage size configured for delaying the distribution of the merged video stream for a specific time duration, wherein the data storage size and the time duration of the delay are determined based on a location of the aircraft with respect to the ground-based cellular network.

11. The video processing system of claim 10, wherein the first receiving module receives signals from a first cellular tower of the ground-based cellular network and the second receiving module receives signals from a second cellular tower of the ground-based cellular network.

12. The video processing system of claim 10, further comprising:
a random access memory device configured for buffering the first video stream and the second video stream.

13. The video processing system of claim 12, wherein the merged video stream is provided by selectively reading from the random access memory device.

14. The video processing system of claim 10, wherein the data processing module is further configured for distributing the merged video stream to at least one end device.

* * * * *